United States Patent
Huang et al.

(10) Patent No.: US 6,870,825 B1
(45) Date of Patent: Mar. 22, 2005

(54) PILOT SIGNAL TRANSMISSION IN A MULTI-TRANSMIT ANTENNA WIRELESS COMMUNICATION SYSTEM

(75) Inventors: Howard C. Huang, New York, NY (US); Achilles George Kogiantis, Madison, NJ (US); Harish Viswanathan, Basking Ridge, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 768 days.

(21) Appl. No.: 09/655,729

(22) Filed: Sep. 6, 2000

(51) Int. Cl.[7] .............................................. H04B 7/06
(52) U.S. Cl. ..................................... 370/342; 370/209
(58) Field of Search ......................... 455/101; 370/208, 370/209, 310, 328, 329, 335, 342, 345, 350

(56) References Cited

U.S. PATENT DOCUMENTS

| | | | |
|---|---|---|---|
| 5,652,764 A | | 7/1997 | Kanzaki et al. ............. 375/200 |
| 5,886,987 A | * | 3/1999 | Yoshida et al. ............. 370/318 |
| 6,115,406 A | * | 9/2000 | Mesecher ..................... 375/130 |
| 6,252,864 B1 | * | 6/2001 | Hayashi ....................... 370/335 |
| 6,600,934 B1 | * | 7/2003 | Yun et al. .................... 455/562.1 |
| 2003/0007463 A1 | * | 1/2003 | Li et al. ....................... 370/310 |

FOREIGN PATENT DOCUMENTS

EP     1 063 790 A1    12/2000    ............ H04B/7/06

OTHER PUBLICATIONS

"3GPP RAN S1.14 V2.0.0, UTRA FDD; Physical layer procedures" Online!, Apr. 1999, Retrieved from the Internet: <URL: www.3GPP.ORG>, pp. 1–32.
European Search Report.

\* cited by examiner

*Primary Examiner*—Chi Pham
*Assistant Examiner*—Derrick W Ferris

(57) ABSTRACT

Pilot signals transmitted by different antennas in a wireless communication system using multiple transmit antennas are distinguished using different codes. In one embodiment, each of two antennas simultaneously transmit a time slot's worth of data while time division multiplexing a pilot signal with the data. The pilot signal from the first antenna is encoded with a first code such as a Walsh code and the pilot signal from the second antenna is encoded with a different code such as a different Walsh code. The different codes enable a receiver to distinguish the pilot signals when they are received to enable coherent detection of signals transmitted by both of the antennas.

13 Claims, 2 Drawing Sheets n=1 n=2 n=N

PILOT SIGNAL TRANSMISSION IN A MULTI-TRANSMIT ANTENNA WIRELESS COMMUNICATION SYSTEM

BACKGROUND OF THE INVENTION

1. Field of the Invention

The present invention relates to communications; more specifically, wireless communications.

2. Description of the Related Art

In some wireless data communication systems, data is transmitted in time slots that are intended for a particular mobile receiver. In order to enable coherent detection, a pilot signal is time division multiplexed into the data contained in the time slot. In wireless communication systems using multiple transmit antennas, time slots containing data are transmitted on two different antennas using the same carrier frequency. In order to provide coherent reception, it is desirable to send a pilot signal from each of the antennas. If a pilot signal sample is time division multiplexed into each of the time slots, it is difficult for a receiver to distinguish which pilot sample is associated with which antenna.

SUMMARY OF THE INVENTION

The present invention provides a method for easily distinguishing between pilot signals transmitted by different antennas in a wireless communication system using multiple transmit antennas. In one embodiment, each of two antennas simultaneously transmit a time slot's worth of data while time division multiplexing a pilot signal with the data. The pilot signal from the first antenna is encoded with a first code such as a Walsh code and the pilot signal from the second antenna is encoded with a different code such as a different Walsh code. The different codes enable a receiver to distinguish the pilot signals when they are received to enable coherent detection of signals transmitted by both of the antennas.

DETAILED DESCRIPTION OF THE INVENTION

Figure 1:
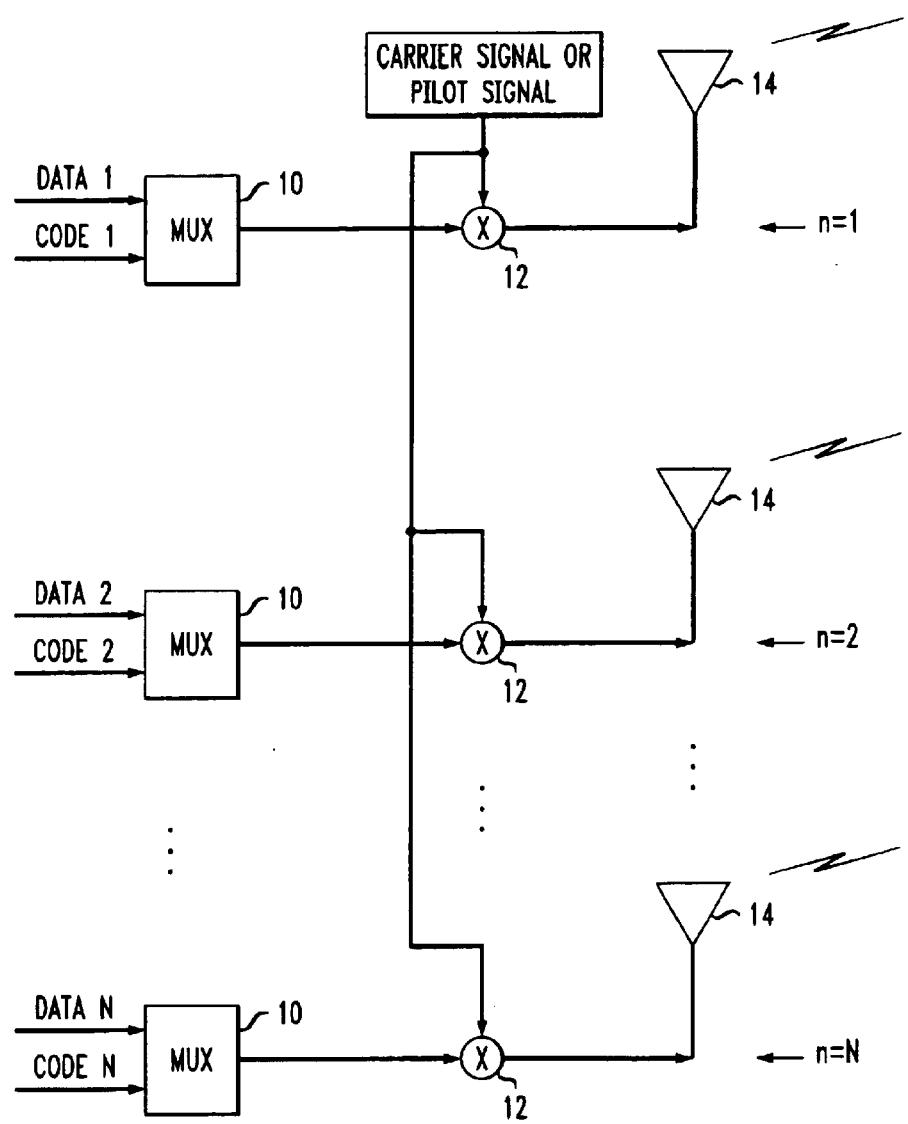
FIG. 1 illustrates a communication system using multiple transmit antennas where the pilot signal is encoded with a different code for each of the antennas.

FIG. 1 illustrates a wireless communication system where data is simultaneously or substantially simultaneously transmitted over three transmit antennas. In this example, three antennas are shown; however, two or more antennas may be used. Each of the antennas receives a different data stream via multiplexer 10. The data from each multiplexer 10 is provided to mixer 12 which mixes the data stream with a common carrier signal or a common pilot signal such as a modulated or encoded carrier signal. The resulting RF signals are provided to antennas 14 for transmission to a receiver. The data transmissions occur during time slots which may be assigned to a particular mobile station or receiver. During the time slots, in addition to me transmitting the data, a sample of the carrier signal or pilot signal are time division multiplexed with the data in the time slot to enable a mobile station to coherently receive the transmissions. When the carrier or pilot signal is to be transmitted, multiplexer 10 enables a code input to pass through to mixer 12. Each of the multiplexers receives a different code. For example, transmission path n=1 may receive a first Walsh code, transmission path n=2 may receive a second different Walsh code and transmission path n=N may receive a Walsh code that is different than codes 1 and 2. It should be noted that each of the codes are different. It is preferable to provide each of the transmission paths with a different orthogonal code such as a Walsh code; however, other types of distinguishable codes may be used. In signal transmission path n=1, code 1 is mixed with the carrier or pilot signal in mixer 12 and transmitted over antenna 14 to a receiver. In a similar fashion, code 2 is mixed with the carrier or pilot signal in transmission path n=2 and code N is mixed with the carrier or pilot signal in transmission path n=N. As a result, a receiver can distinguish the different carrier or pilot signal samples provided by each of the transmission paths by using the code that was mixed with the carrier or pilot to separate the carrier or pilot sample signals upon reception.

Figure 2:
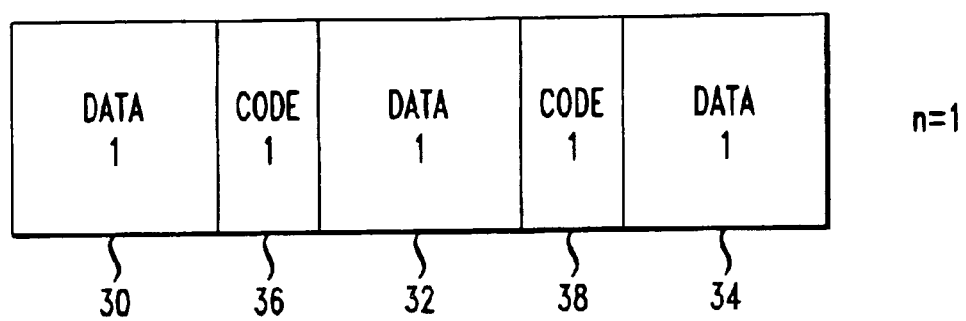
FIG. 2 illustrates the structure of the information transmitted in a time slot for three different antennas.
Figure 2:
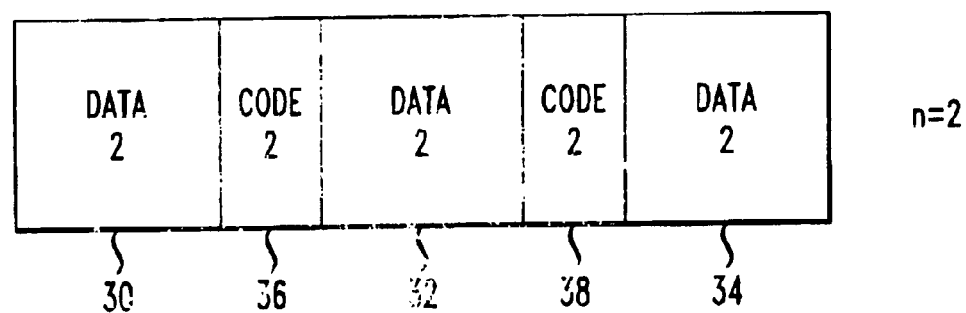
Figure 2:
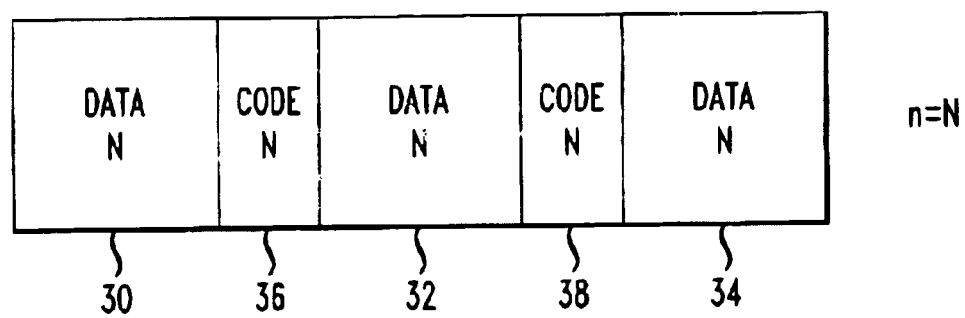

FIG. 2 illustrates the information contained in a time slot transmitted via transmission paths n=1, n=2 and n=N. Each of the time slots are transmitted simultaneously or substantially simultaneously, and the carrier or pilot signals are time division multiplexed into the data stream of each slot simultaneously or substantially simultaneously. As a result, time slot sub-periods 30, 32 and 34 and pilot sub-periods 36 and 38 are time aligned across the time slots transmitted by each of the transmission paths. It should be noted that different data may be transmitted in each of the different transmission paths.

The invention claimed is:

1. A communication method, comprising:

encoding a pilot signal using a plurality of codes to produce a plurality of encoded pilot signals, the plurality of codes having at least a first and a second code where the first and second codes are different, and the plurality of encoded pilot signals have at least a first and a second encoded pilot signal;

time division multiplexing the first and second encoded pilot signals with data; and transmitting the first and second encoded pilot signals substantially simultaneously with said data on a different antenna.

2. The method of claim 1, wherein the plurality of codes are orthogonal.

3. The method of claim wherein the plurality of codes are Walsh codes.

4. A communication method, comprising the steps of:

encoding a pilot signal using a first code to produce a first encoded pilot signal; encoding the pilot signal using a second code to produce a second encoded pilot signal; where the first and second codes are different;

time division multiplexing the first and second encoded pilot signals with data; and transmitting the first and second encoded pilot signals substantially simultaneously with said data on different antennas.

5. The method of claim 4, wherein the first and second encoded pilot signals are transmitted substantially simultaneously.

6. The method of claim 4, wherein the first and second codes are orthogonal.

7. The method of claim 6, wherein the first and second codes are Walsh codes.

8. A communication method, comprising:

encoding a carrier signal using a plurality of codes to produce a plurality of encoded carrier signals, the plurality of codes having at least a first and a second code where each of the plurality of codes are different, and the plurality of encoded carrier signals having at least a first and a second encoded carrier signal;

time division multiplexing each of the plurality of encoded carrier signals with data; and transmitting each of the plurality of encoded carrier signals substantially simultaneously with said data on a different antenna.

9. The method of claim 8, wherein the plurality of codes are orthogonal.

10. The method of claim 9, wherein the plurality of codes are Walsh codes.

11. A communication method, comprising:

encoding a carrier signal using a first code to produce a first encoded carrier signal; encoding the carrier signal using a second code to produce a second encoded carrier signal, where the first and second codes are different;

time division multiplexing the first and second encoded carrier signals with data; and transmitting the first and second encoded carrier signals substantially simultaneously with said data on different antennas.

12. The method of claim 11, wherein the first and second codes are orthogonal.

13. The method of claim 12, wherein the first and second codes are Walsh codes.

* * * * *